US012768815B2

(12) United States Patent
Yatsuda

(10) Patent No.: US 12,768,815 B2
(45) Date of Patent: Oct. 20, 2026

(54) SHEAR-MODE LIQUID-PHASE SENSOR HAVING GROOVE STRUCTURE AND METHODS OF MANUFACTURING AND USING THE SAME

(71) Applicant: Hiromi Yatsuda, Taoyuan City (TW)

(72) Inventor: Hiromi Yatsuda, Taoyuan City (TW)

(73) Assignee: TST BIOMEDICAL ELECTRONICS CO., LTD., Taoyuan City (TW)

( * ) Notice: Subject to any disclaimer, the term of this patent is extended or adjusted under 35 U.S.C. 154(b) by 151 days.

(21) Appl. No.: 17/962,787

(22) Filed: Oct. 10, 2022

(65) Prior Publication Data

US 2024/0118242 A1 Apr. 11, 2024

(51) Int. Cl.
*G01N 29/02* (2006.01)

(52) U.S. Cl.
CPC ..... *G01N 29/022* (2013.01); *G01N 2291/012* (2013.01); *G01N 2291/0256* (2013.01); *G01N 2291/0423* (2013.01); *G01N 2291/106* (2013.01)

(58) Field of Classification Search
CPC ........... G01N 29/022; G01N 2291/012; G01N 2291/0256; G01N 2291/0423; G01N 2291/106; G01N 29/036; G01N 29/222
See application file for complete search history.

(56) References Cited

U.S. PATENT DOCUMENTS 7,878,063 B1 * 2/2011 Cular .................. G01N 29/024
73/61.79
2017/0134002 A1 * 5/2017 Rivas ................ B01L 3/502761

* cited by examiner

*Primary Examiner* — Tarun Sinha
(74) *Attorney, Agent, or Firm* — Volpe Koenig

(57) ABSTRACT

The present invention discloses a shear-mode liquid-phase sensor having a groove structure including a sensing area, over which a plurality of surface acoustic waves propagate, forming thereon the groove structure along a propagation direction of the plurality of surface acoustic waves, wherein the groove structure has a bottom surface to be bound with target molecules, a width ranging from 100% to 500% of a maximum length of each target molecule and a depth ranging from 50% to 500% of the maximum length of each target molecule.

8 Claims, 11 Drawing Sheets

SHEAR-MODE LIQUID-PHASE SENSOR HAVING GROOVE STRUCTURE AND METHODS OF MANUFACTURING AND USING THE SAME

FIELD OF THE INVENTION

The present invention is related to a shear-mode liquid-phase sensor. In particular, the present invention is related to a shear-mode liquid-phase sensor with a groove structure.

BACKGROUND OF THE INVENTION

A biochip is a chip designed to detect or quantify target analytes such as protein, DNA, cell, glucose, cardiovascular disease biomarker, cancer biomarker, bacteria and virus. Many biochips are affinity-based, which means that they use a fixed capture probe on a sensing surface to bind the target analyte, and characteristic changes caused by the interaction between the fixed capture probe and the target analyte on the sensing surface are detected by a reader.

There are various important requirements for a sensor system, such as portability, low cost per test, maximum achievable sensitivity and specificity, and ease of use. Acoustic devices have found wide applications in chemical and biosensing fields owing to their high sensitivity, ruggedness and miniaturized design. Anything that influences the wave propagation or causes surface perturbations at device interface, would lead to a change in the characteristic parameters including resonance frequency, acoustic wave velocity and other acoustoelectric properties of these devices. Shear-mode liquid-phase sensors are shear-mode acoustic wave sensors that detect analytes in the liquid phase. Representative Shear-mode liquid-phase sensors include Shear Horizontal Surface Acoustic Wave (SH-SAW) sensors, Quartz Crystal Microbalance (QCM) sensors and Bulk Acoustic Wave (BAW) sensors.

Acoustic devices can use an antigen-antibody reaction to estimate the concentration of antigens in a biological sample through changes in the propagation characteristics of the acoustic waves.

There are usually different target analytes in the biological sample. For example, there are different proteins or biomarkers in the blood. In some cases, the acoustic devices cannot accurately analyze the amount or presence of the analyte, resulting in the decreased detection sensitivity. For example, some proteins of the same type have a common molecular, and this makes it impossible for the acoustic devices to distinguish the amount of a particular molecule from other molecules in the biological fluid. Alternatively, when the size of an analyte is relatively large (e.g., viral particles), the acoustic devices cannot detect the characteristic changes caused by the analyte in the liquid phase.

In order to overcome the above-mentioned problems existing in the sensor system, there is a need for a sensor system and a method that can analyze a target molecule in the biological sample with a better accuracy and sensitivity.

SUMMARY OF THE INVENTION

The present invention provides a shear-mode liquid-phase sensor having a groove structure for estimating the amount of target molecules in a biological liquid, wherein the amounts of the target molecules can be estimated by the shear-mode liquid-phase sensor with a better accuracy and sensitivity.

In one aspect, the present invention discloses a shear-mode liquid-phase sensor having a groove structure including a sensing area, over which a plurality of surface acoustic waves propagate, forming thereon the groove structure along a propagation direction of the plurality of surface acoustic waves, wherein the groove structure has a bottom surface to be bound with target molecules, a width ranging from 100% to 500% of a maximum length of each target molecule and a depth ranging from 50% to 500% of the maximum length of each target molecule.

The present invention further discloses a shear-mode liquid-phase sensor having a groove structure including a sensing area, over which a plurality of surface acoustic waves propagate, forming thereon the groove structure along a propagation direction of the plurality of surface acoustic waves, wherein the groove structure has a bottom surface to be bound with target molecules, a width ranging from 100% to 500% of a maximum length of each target molecule and a depth ranging from 50% to 500% of the maximum length of each target molecule, and wherein the groove structure comprises a plurality of sub-channels uniformly arranged along the propagation direction of the plurality of surface acoustic waves, and each sub-channel comprises a recess region and a flat region.

In another aspect, the present invention discloses a method of manufacturing a shear-mode liquid-phase sensor having a groove structure, the method includes the steps of:

(a) providing a piezoelectric substrate having two ends,
(b) performing one of the following two steps:
  (b1) depositing and patterning a first material and a second material to form a plurality of electrodes at either one or both of the two ends, and a sensing area between the two ends respectively at the same time, and
  (b2) depositing and patterning the first material to form the plurality of electrodes at either one or both of the two ends, and then depositing the second material to form the sensing area between the two ends, and
(c) forming the groove structure on the sensing area, wherein the groove structure has a bottom surface to be bound with target molecules, a width ranging from 100% to 500% of a maximum length of each target molecule and a depth ranging from 50% to 500% of the maximum length of each target molecule.

The present invention further discloses a method using the shear-mode liquid-phase sensor having the groove structure in estimating an amount of specific molecules in a biological liquid, wherein the biological liquid includes a plurality of molecules having a common binding region, the method includes the steps of providing the shear-mode liquid-phase sensor having the groove structure, wherein the groove structure has the width corresponding to 100% to 500% of a maximum length of each specific molecule and the depth corresponding to 50% to 500% of the maximum length of each specific molecule, and the groove structure is coated with a probe binding to the common binding region, causing the plurality of molecules in the biological liquid to interact with the shear-mode liquid-phase sensor to trap the specific molecules in the groove structure, and estimating the amount of the specific molecules by measuring a characteristic change of the shear-mode liquid-phase sensor after the specific molecules are trapped in the groove structure.

The present invention further discloses a method using the shear-mode liquid-phase sensor having the groove structure in estimating an amount of target molecules in a biological liquid, wherein the shear-mode liquid-phase sensor comprises a sensing area including the groove structure, the method includes the steps of providing the shear-mode liquid-phase sensor having the groove structure, wherein the groove structure has the width corresponding to 100% to 500% of a maximum length of the target molecule and the depth corresponding to 50% to 500% of the maximum length of the target molecule, and the groove structure is coated with a probe binding to the target molecule, causing the target molecules in the biological liquid to interact with the shear-mode liquid-phase sensor and to be trapped in the groove structure, and estimating the amount of the target molecules by measuring a characteristic change of the shear-mode liquid-phase sensor after the target molecules are trapped in the groove structure.

BRIEF DESCRIPTION OF THE DRAWINGS

The objectives and advantages of the present invention will become more readily apparent to those ordinarily skilled in the art after reviewing the following detailed descriptions and accompanying drawings.

DETAILED DESCRIPTION OF THE PREFERRED EMBODIMENTS

The present invention will now be described more specifically with reference to the following embodiments. It is to be noted that the following descriptions of the preferred embodiments of this invention are presented herein for purpose of illustration and description only; they are not intended to be exhaustive or to be limited to the precise form disclosed.

The shear-mode liquid-phase sensor of the present invention is used to estimate an amount of specific molecules in a biological liquid. The shear-mode liquid-phase sensor in the present invention includes but is not limited to Shear Horizontal Surface Acoustic Wave (SH-SAW) sensor, Quartz Crystal Microbalance (QCM) sensor and a Bulk Acoustic Wave (BAW) sensor. The term "biological liquid" as used herein refers to the biological liquid such as urine, serum, whole blood, cell lysate, saliva, etc.

The term "molecule", "target molecule" or "specific molecule" as used herein refers to a protein or a biomarker presenting in the above biological liquid that can interact with a probe fixed on the sensor, and includes but is not limited to lipoprotein, cholesterol, acute phase reactant (such as C-reactive protein (CRP) and serum amyloid A (SAA)), antibody and cytokine, or other substances presenting in the biological liquid. Additionally, the target molecule in the present invention may also include pathogens in the biological liquid, such as viral particle. The term "amount of the molecule" as used herein preferably refers to the concentration of the above-mentioned molecule in the biological liquid.

Figure 1:
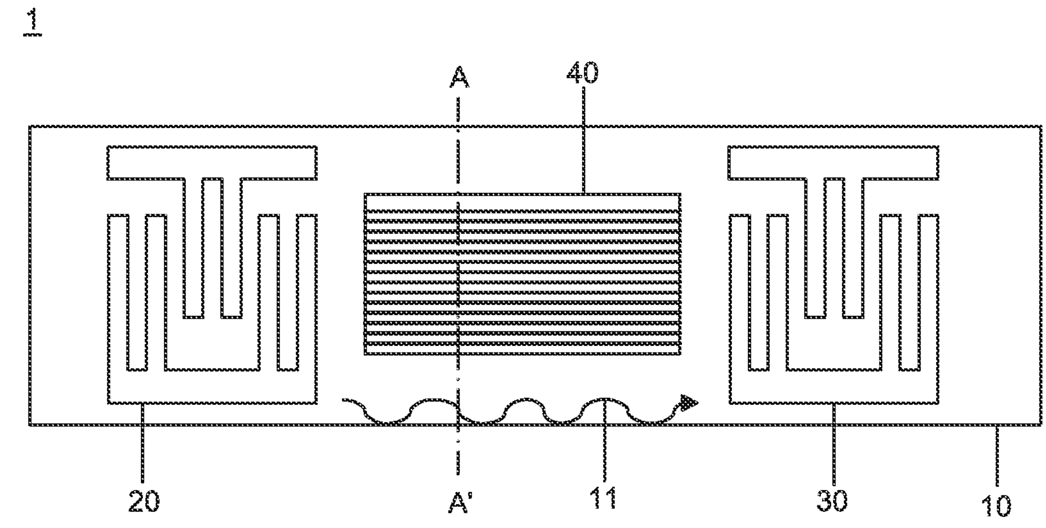
FIG. 1 is a schematic diagram of a shear-mode liquid-phase sensor according to a preferred embodiment of the present invention.

FIG. 1 shows an example of the shear-mode liquid-phase sensor 1 in the present invention, which is a Shear Horizontal Surface Acoustic Wave (SH-SAW) sensor with delay line configuration. The SH-SAW sensor includes a piezoelectric substrate 10. A first transducer 20, a second transducer 30 and a sensing area 40 are formed on the piezoelectric substrate 10. The first transducer 20 excites and transmits acoustic waves 11. The transmitted acoustic waves 11 propagate on the sensing area 40 between the first transducer 20 and the second transducer 30. The second transducer 30 placed along the propagation direction of the acoustic waves 11 at a defined distance from the first transducer 20 receives the transmitted acoustic waves 11 and converts the acoustic signal of the transmitted acoustic waves 11 back to an electrical signal. Sensor response is represented as a shift in the SAW delay time, a shift in the transmission loss, a phase shift between the exciting and the receiving transducers, or a combination thereof.

The sensing area 40 in FIG. 1 includes a plurality of grooves disposed along the propagation direction of the acoustic waves 11. These grooves are parallel to one another. In the present invention, the term "groove structure" can be used as a general term for all grooves in the sensing area, or refers to a single groove in the sensing area. The details of the groove structure in the present invention will be described as follows.

Figure 2:
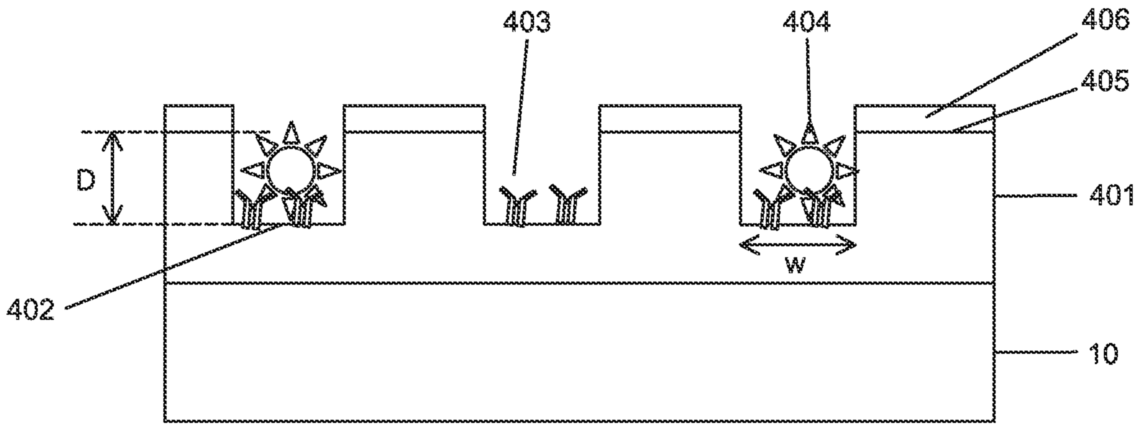
FIG. 2 is a cross-sectional view of FIG. 1 along Line A-A'.

FIG. 2 is a cross-sectional view of FIG. 1 along Line A-A'. For clarity of presentation, three grooves are depicted in FIG. 2 to exemplarily represent the groove structure 401. Each groove of the groove structure 401 has a bottom surface 402 coated with a probe 403 (such as an antibody) to bind a target molecule 404 (such as an antigen). Optionally, the groove structure 401 has a blocking layer 406 on the top surface 405, which is not coated with the probe 403 to avoid the target molecule 404 from binding to the top surface 405. Each groove of the groove structure 401 has a width W and a depth D corresponding to the size of the target molecule 404. For adapting to different target molecules, the width W ranges from 100% to 500% of a maximum length of each target molecule and the depth D ranges from 50% to 500% of the maximum length of each target molecule.

Specifically, the width W ranges from 10~5,000 nm or any range therebetween, and the depth D ranges from 5~5,000 nm or any range therebetween. After the biological liquid is applied on the sensing area 40 and the antigen-antibody reaction is completed, only the molecules that fit the width W and the depth D of the groove structure 401 can be trapped in the groove structure 401.

The width W and the depth D of the groove structure 401 can be varied to capture different target molecules. If the target molecule is a protein, the width W ranges from 10~500 nm, such as 10~400 nm, 10~300 nm, 10~200 nm, 10~100 nm, 10~80 nm, 10~60 nm, 20~60 nm and 40~60 nm, and the depth D ranges from 5~500 nm, such as 5~400 nm, 5~300 nm, 5~200 nm, 10~200 nm, 10~150 nm, 10~100 nm, 20~100 nm, 30~100 nm, 30~80 nm and 30~60 nm. If the target molecule is an antibody, the probe is an immunogenic protein, and the ranges of the width W and the depth D are similar to those for a protein. If the target molecule is a virus particle, the width W ranges from 100~5,000 nm, such as 100~4,000 nm, 100~3,000 nm, 100~2,000 nm, 100~1,000 nm, 200~1,000 nm and 200~500 nm, and the depth D ranges from 50~5,000 nm, such as 50~4,000 nm, 50~3,000 nm, 100~3,000 nm, 100~2,000 nm, 100~1,000 nm, 200~1,000 nm and 200~500 nm.

Figure 3:
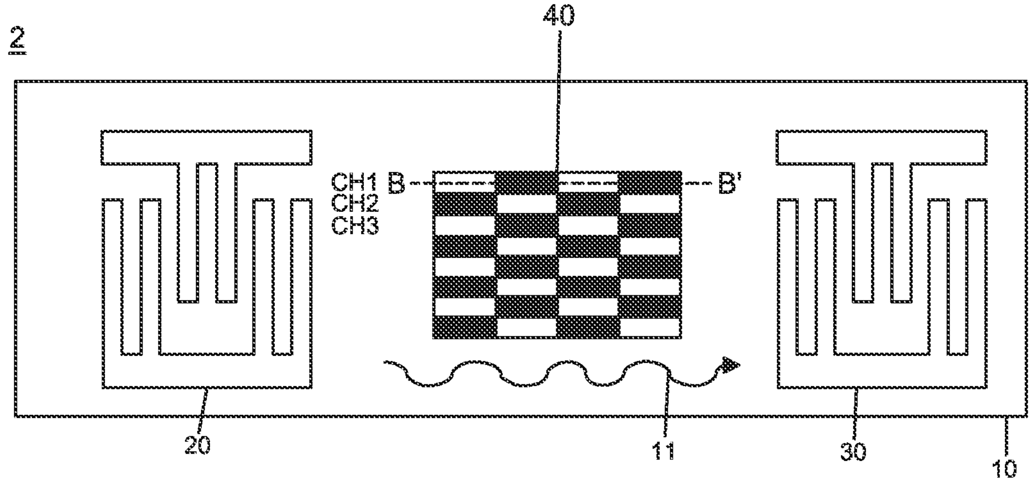
FIG. 3 is a schematic diagram of the shear-mode liquid-phase sensor according to another preferred embodiment of the present invention.

Please refer to FIG. 3, which shows another preferred embodiment of the shear-mode liquid-phase sensor in the present invention. The shear-mode liquid-phase sensor 2 including a piezoelectric substrate 10, a first transducer 20 and a second transducer 30 in FIG. 3 has a configuration similar to that in FIG. 1, however, the sensing area 40 includes a plurality of sub-channels (CH1, CH2, CH3, etc.) uniformly arranged along the propagation direction of the acoustic waves 11. These sub-channels paralleled to one another constitute the groove structure. The details of the groove structure in FIG. 3 will be described as follows.

Figure 4:
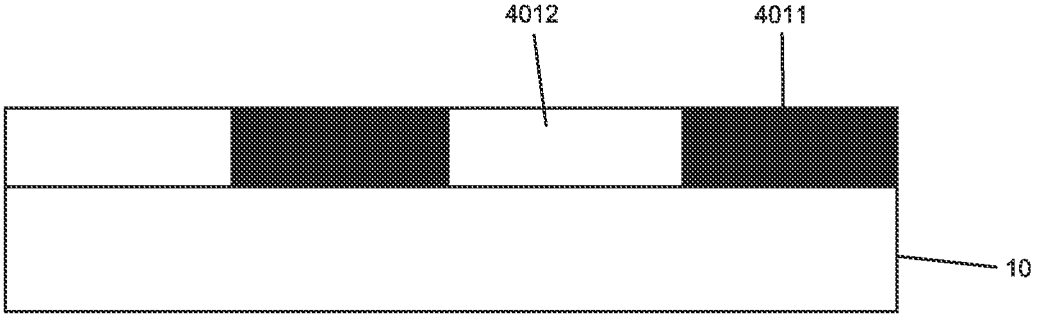
FIG. 4 is a cross-sectional view of FIG. 3 along Line B-B'.

FIG. 4 is a cross-sectional view of FIG. 3 along Line B-B'. Because the Line B-B' in FIG. 3 is perpendicular to the Line A-A' in FIG. 1, the cross-sectional view in FIG. 4 is also perpendicular to that in FIG. 2. Each sub-channel in the sensing area includes a plurality of recess regions 4011 and a plurality of flat regions 4012. As shown in FIGS. 3 and 4, the recess regions 4011 and the flat regions 4012 are not only arranged alternatively on each sub-channel but arranged alternatively on adjacent sub-channels, such that the areas of the recess regions 4011 in every sub-channel are substantially equal. Accordingly, the characteristic changes caused by the target molecule on every sub-channel are substantially equal. In detail, the phase shifts of every sub-channel between input and output transducers (i.e. the first transducer 20 and the second transducer 30 in FIG. 3) are almost equal. Then, all of output signals of each sub-channel can be summed in-phase, and thus a maximum output signal can be obtained. The definitions for the width W and the depth D of each recess region 4011 in FIG. 4 are identical to those of each groove in FIG. 2. That is to say, the width W and the depth D of each recess region 4011 in FIG. 4 range from 100% to 500% and 50% to 500% of the maximum length of each target molecule, respectively.

Figure 5:
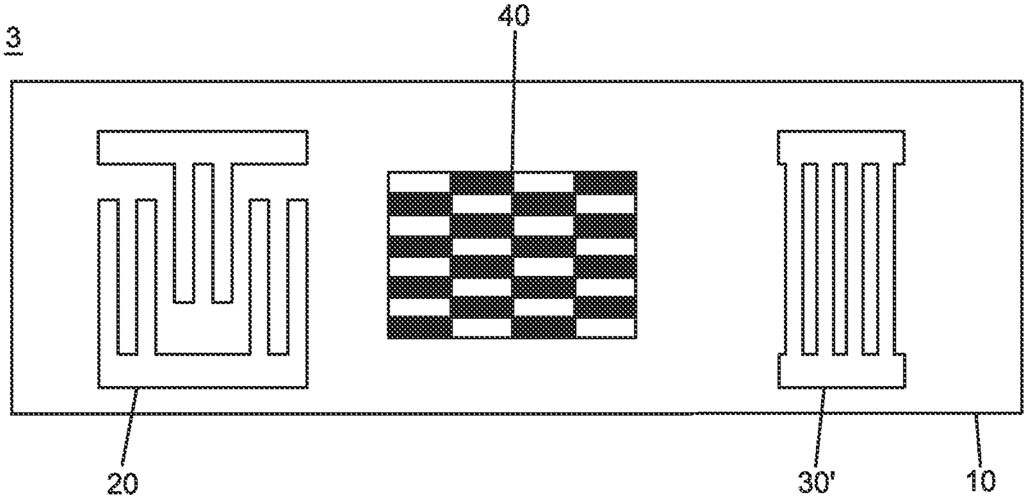
FIG. 5 is a schematic diagram of the shear-mode liquid-phase sensor according to still another preferred embodiment of the present invention.

FIG. 5 shows an equivalent configuration of the shear-mode liquid-phase sensor in FIG. 3. The shear-mode liquid-phase sensor in the present invention includes at least one transducer for transmitting and receiving the surface acoustic waves. Conventionally, as shown in FIG. 3, the shear-mode liquid-phase sensor 2 has at least two transducers 20, 30 disposed on two opposite ends along the propagation direction of the surface acoustic waves 11. In FIG. 5, the transducer on the output end (right side) can be replaced by a reflector 30', and thus the shear-mode liquid-phase sensor 3 as shown in FIG. 5 includes at least one transducer 20 and a reflector 30'. In the reflected type shear-mode liquid-phase sensors 3 in FIG. 5, the surface acoustic waves are reflected by the reflector 30', and then converted into electrical signals by the transducer 20.

The shear-mode liquid-phase sensor in the present invention can be configured with or without a reference channel. In the reference channel, the groove structure is not coated with the probe that binds to the target molecule. In the presence of the reference channel, some kinds of measurement errors can be compensated. However, the shear-mode liquid-phase sensor in the present invention can work without the reference channel.

In another aspect, the present invention provides a method of manufacturing a shear-mode liquid-phase sensor having a groove structure. The steps of the manufacturing method in the present invention will be described as follows.

Figure 6A:
FIGS. 6A-6E are schematic diagrams of the steps of a method of manufacturing the shear-mode liquid-phase sensor according to the first preferred embodiment of the present invention.
Figure 6B:
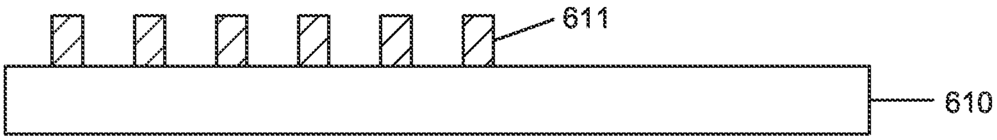

FIGS. 6A-6E show the steps of a method of manufacturing the shear-mode liquid-phase sensor according to the first preferred embodiment of the present invention. For clarity of presentation, only the input end of the shear-mode liquid-phase sensor is depicted in FIGS. 6A-6E. A skilled person in the art may understand that the input end and the output end of the shear-mode liquid-phase sensor are symmetric. In FIG. 6A, a piezoelectric substrate 610 having two ends is provided, and in FIG. 6B, a photo resist 611 is provided at either one or both of the two ends of the piezoelectric substrate 610 in order to form electrodes. When the electrodes are formed at one of the two ends, the shear-mode liquid-phase sensor has at least one transducer at one end and a reflector at the other end of the piezoelectric substrate 610. When the electrodes are formed at the two ends, the shear-mode liquid-phase sensor has at least one transducer at one end and an additional transducer at the other end of the piezoelectric substrate 610.

Figure 6C:
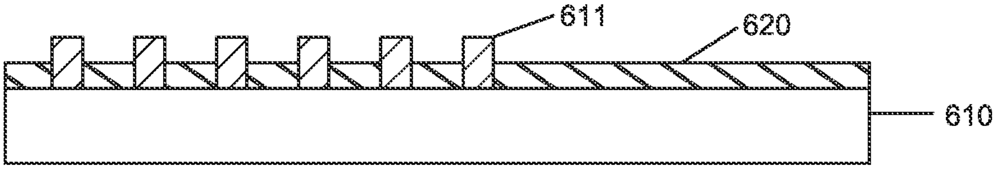

In the manufacturing method of the present invention, a first material and a second material are used to form the electrodes and the sensing area, respectively. The first material and the second material may be the same material or different materials. When the first material and the second material are the same, the first material and the second material are deposited and patterned on the piezoelectric substrate 610 at the same time to form a base layer 620, as shown in FIG. 6C. When the first material and the second material are different, the first material is deposited and patterned at either one or both of the two ends of the piezoelectric substrate 610 to form the electrodes, and the second material is then deposited between the two ends of the piezoelectric substrate 610 to form the sensing area.

Figure 6D:
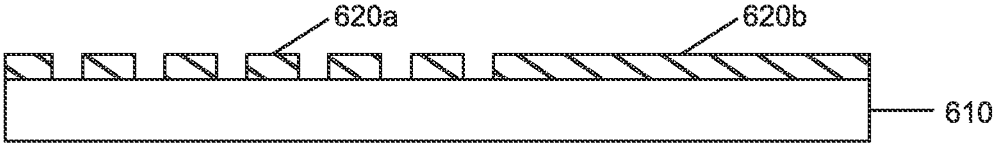
Figure 6E:
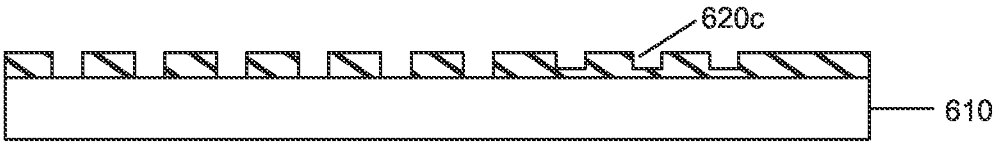

In FIG. 6D, the photo resist 611 is removed to form the electrodes 620*a* at either one or both of the two ends and the sensing area 620*b* between the two ends. In FIG. 6E, a groove structure 620*c* having a plurality of grooves is formed on the sensing area 620*b*. Preferably, the groove structure 620*c* is formed by a deposition process, an etching process or a combination thereof, wherein the deposition process is preferably an evaporation process, a chemical vapor deposition process or a sputtering process, and the etching process is a wet etching process or a dry etching process (e.g., a focused ion beam etching process and an ion milling etching process).

In the present invention, each groove of the groove structure has a bottom surface to be bound with target molecules, a width ranging from 100% to 500% of a maximum length of each target molecule and a depth ranging from 50% to 500% of the maximum length of each target molecule. Preferably, the width W ranges from 10~5,000 nm or any range therebetween, and the depth D ranges from 5~5,000 nm or any range therebetween.

In the shear-mode liquid-phase sensor in the present invention, the sensing area consists of one or more layers. In the first embodiment as shown in FIG. 6A-6E, the sensing area 620*b* consists of the base layer 620, and the groove structure 620*c* is formed by the material that forms the base layer 620. In other embodiments, the sensing area may consist of two or three layers and the groove structure may be formed by one or two materials, as shown in FIG. 7A to FIG. 9H.

Figure 7A:
FIGS. 7A-7G are schematic diagrams of the steps of a method of manufacturing the shear-mode liquid-phase sensor according to the second preferred embodiment of the present invention.
Figure 7B:
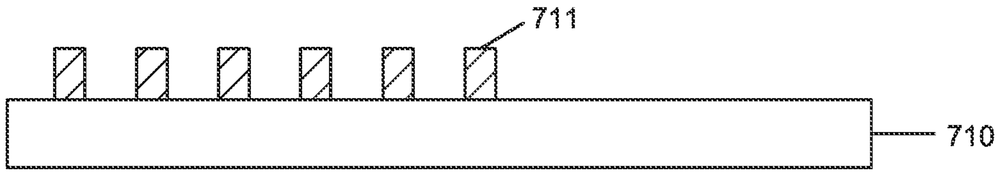
Figure 7C:
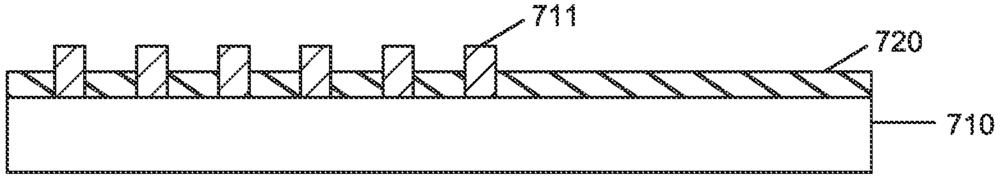
Figure 7D:
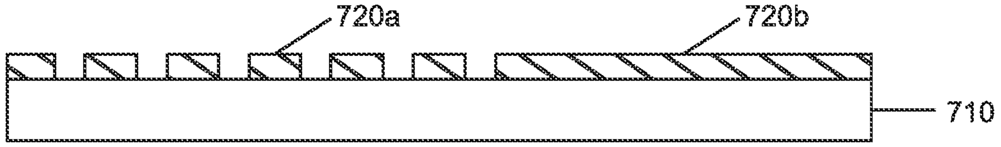
Figure 7E:
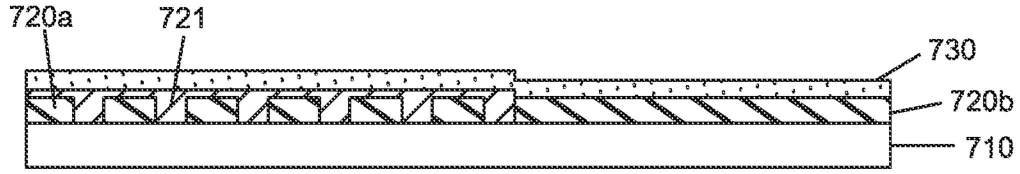
Figure 7F:
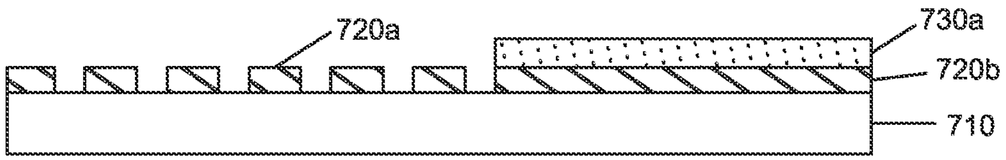
Figure 7G:
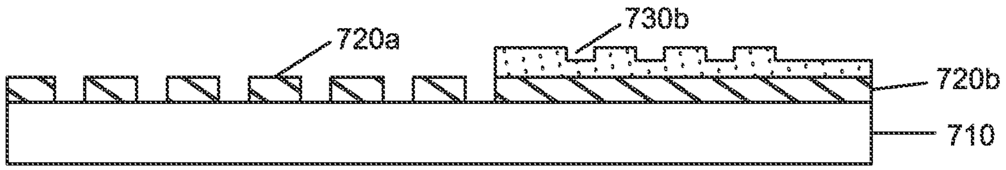

FIGS. 7A-7G are schematic diagrams of the steps of a method of manufacturing the shear-mode liquid-phase sensor according to the second preferred embodiment of the present invention. The steps in FIG. 7A to FIG. 7D are identical to those in FIG. 6A to FIG. 6D. After electrodes 720*a* and a first layer 720*b* of the sensing area are formed on a piezoelectric substrate 710 in FIG. 7D, a photo resist 721 is provided on the electrodes 720*a*, and a third material 730 is deposited on the photo resist 721 and the first layer 720*b* of the sensing area in FIG. 7E. In FIG. 7F, the photo resist 721 is removed to form a second layer 730*a* on the first layer 720*b* of the sensing area. In FIG. 7G, a groove structure 730*b* is formed on the second layer 730*a*. In this embodiment, the sensing area consists of the first layer 720*b* and the second layer 730*a*, and the groove structure 730*b* is made of the third material 730. As shown in FIG. 7G, the groove structure 730*b* is formed by an etching process. In another embodiment as shown in FIG. 8A to FIG. 8G, the groove structure is formed by a deposition process.

Figure 8A:
FIGS. 8A-8G are schematic diagrams of the steps of a method of manufacturing the shear-mode liquid-phase sensor according to the third preferred embodiment of the present invention.
Figure 8B:
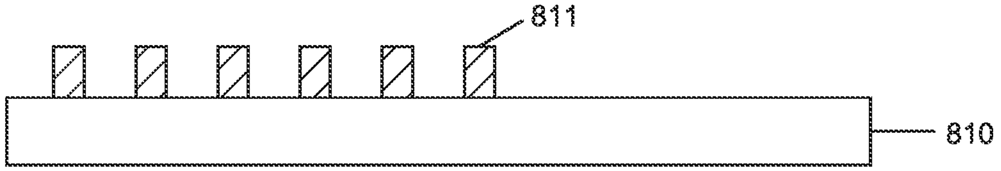
Figure 8C:
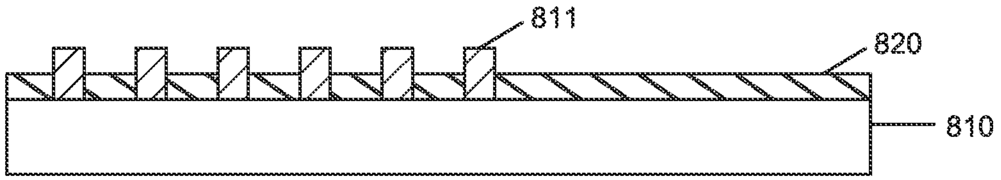
Figure 8D:
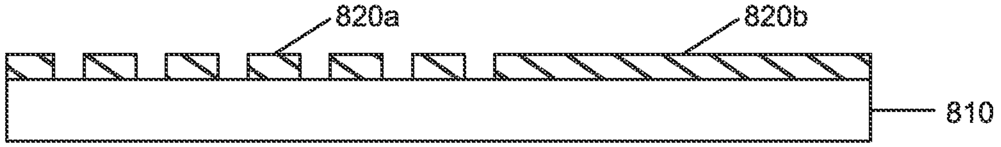
Figure 8E:
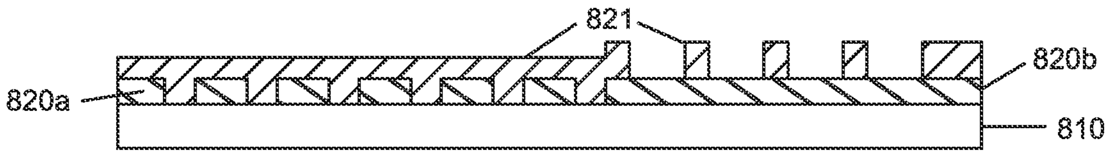
Figure 8F:
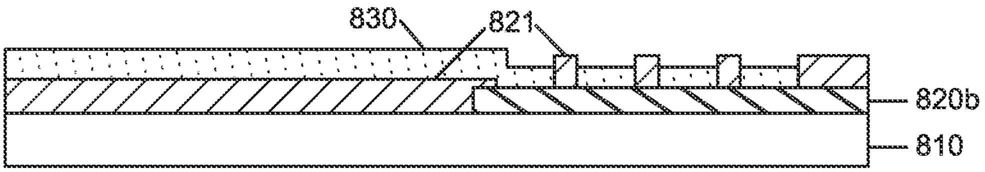
Figure 8G:
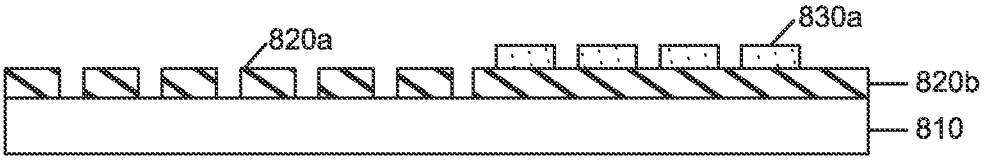

The steps in FIG. 8A to FIG. 8D are identical to those in FIG. 7A to FIG. 7D. However, a photo resist 821 is provided on electrodes 820*a* and a first layer 820*b* of the sensing area in FIG. 8E. A third material 830 (e.g., gold or $SiO_2$) is deposited on the photo resist 821 and the first layer 820*b* of the sensing area in FIG. 8F. In FIG. 8G, the photo resist 821 is removed to form a groove structure 830*a* on the first layer 820*b* of the sensing area.

In the present invention, the first material is gold, aluminum, carbon or titanium, and the second material and the third material are independently selected from gold, tungsten, aluminum, carbon, titanium, silica ($SiO_2$), zinc oxide (ZnO) and a combination thereof. Preferably, the second material is gold, and the third material is gold and/or $SiO_2$.

Figure 9A:
FIGS. 9A-9H are schematic diagrams of the steps of a method of manufacturing the shear-mode liquid-phase sensor according to the fourth preferred embodiment of the present invention.
Figure 9B:
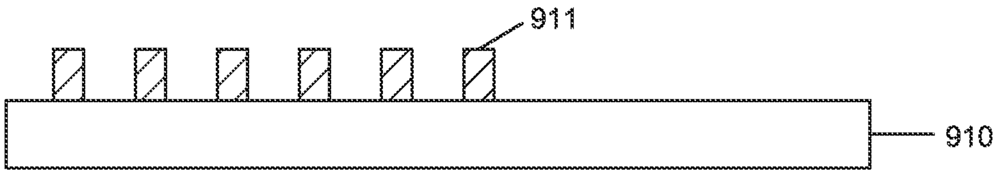
Figure 9C:
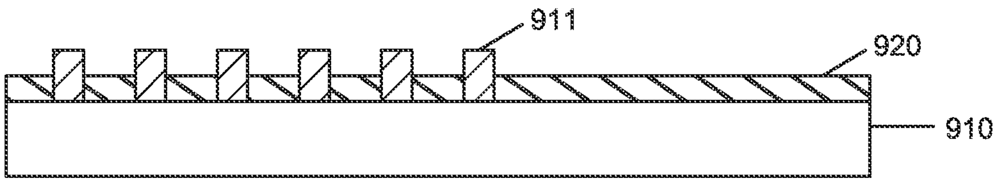
Figure 9D:
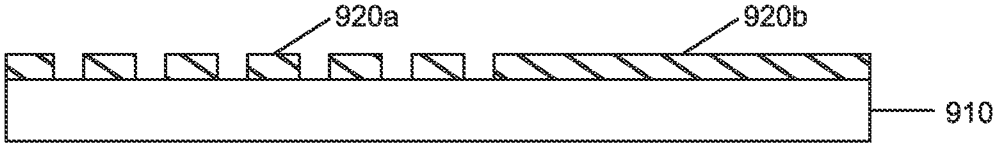
Figure 9E:
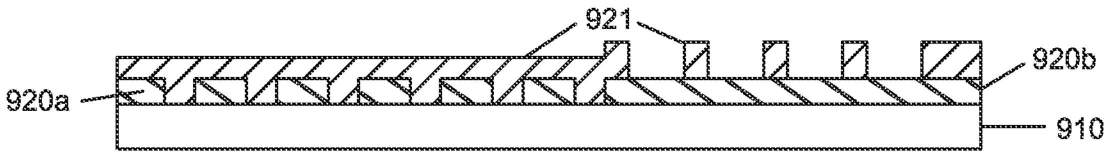
Figure 9F:
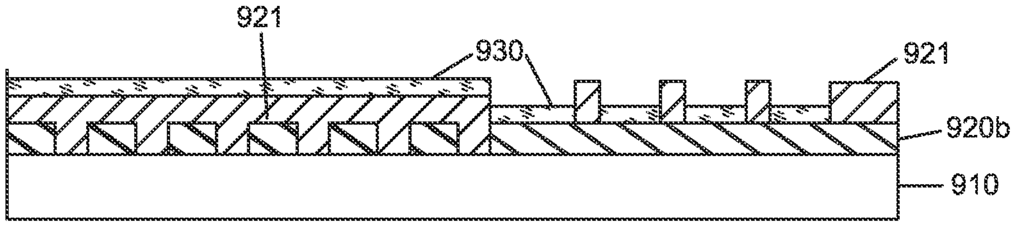
Figure 9G:
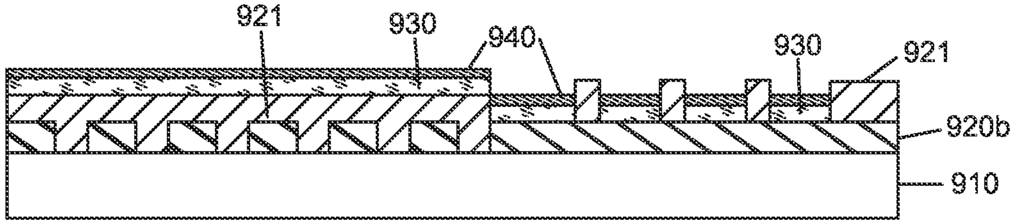
Figure 9H:
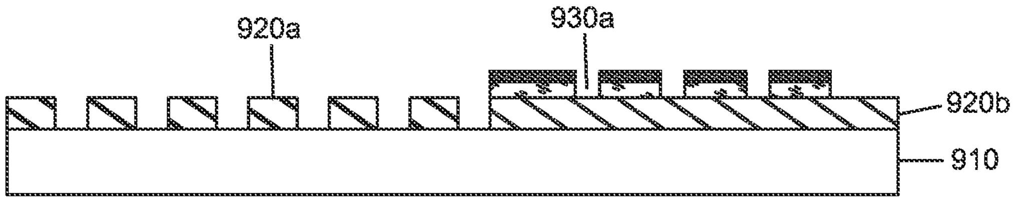

The steps in FIG. 9A to FIG. 9E are identical to those in FIG. 8A to FIG. 8E. However, in this embodiment, the sensing area consists of three layers. In FIG. 9F to FIG. 9G, a second layer 930 and a third layer 940 are formed on the first layer 920*b* of the sensing area by sequentially depositing two different materials (e.g., gold and $SiO_2$). In the present invention, these two different materials are referred to as the third material. In FIG. 9H, the photo resist 921 is removed to form a groove structure 930*a* on the first layer 920*b* of the sensing area. In this embodiment, the sensing area consists of the first layer 920*b*, the second layer 930 and the third layer 940, and the groove structure 930*a* is made of the third material including two different materials.

After the groove structure is formed on the sensing area, the method of manufacturing the shear-mode liquid-phase sensor of the present invention further includes a step of coating the probe on the bottom surface of the groove structure (not shown). The selection of the probe depends on the target molecule to be bound in the groove structure. If the target molecule is a protein (including an antigen), the probe is an antibody, a DNA molecule or an RNA molecule specific to the protein. If the target molecule is an antibody, the probe is an immunogenic protein such as spike protein and nucleocapsid protein of a virus. The probes used in the shear-mode liquid-phase sensor of the present invention include but are not limited to anti-ApoB100 antibody, anti-ApoA1 antibody, anti-ApoE antibody, anti-LP(a) antibody, anti-ApoB48 antibody, anti-C-reactive protein (CRP) antibody, anti-serum amyloid A (SAA) antibody, Severe Acute Respiratory Syndrome coronavirus 2 (SARS-CoV-2) immunogenic proteins, DNA molecule and RNA molecule.

In a further aspect, the present invention provides a method for estimating an amount of specific molecules in a biological liquid by using the shear-mode liquid-phase sensor having the groove structure. This method can estimate the amount of the specific molecules in the biological liquid containing different molecules having a common binding region.

In some specific case, some proteins have a common antigen, and the antibody for this common antigen can capture these proteins simultaneously. In other cases, some antibodies (IgA, IgM and IgG) have a common binding site for an immunogenic protein, and the immunogenic protein can bind to these antibodies simultaneously. As shown in Table 1, ApoB100 presents on chylomicron remnants (CH), very low-density lipoproteins (VLDL), intermediate density lipoproteins (IDL), lipoprotein (a) (LP(a)) and LDL, and thus anti-ApoB100 antibody can capture these lipoproteins simultaneously.

TABLE 1

| | HDL | LDL (small, mid-size, large) | | | LP(a) | IDL | VLDL | CH |
|---|---|---|---|---|---|---|---|---|
| ApoB100 | | + | + | + | + | + | + | + |
| ApoA1 | + | | | | | | | |
| LP(a) | | | | | + | | | |
| ApoE | | | | | | + | + | |
| ApoB48 | | | | | | | | + |

To distinguish one specific type of molecules among these molecules having the common binding region in the biological liquid, the shear-mode liquid-phase sensor having the groove structure in the present invention is provided to trap the specific molecules in the groove structure and allow the amount of the specific molecules to be estimated. Preferably, the common binding region is a common antigen or a binding site of an antibody. In order to capture the different molecules having the common binding region in the biological liquid, the probe binding to the common binding region is coated on the bottom surface of the groove structure. The groove structure has the width W and the depth D corresponding to the size of the specific molecule. For example, the width W corresponds to 100% to 500% of the maximum length of each specific molecule and the depth D corresponds to 50% to 500% of the maximum length of each specific molecule. In one embodiment, the specific molecule is a protein, and the width W preferably ranges from 10~500 nm and the depth D preferably ranges from 5~500 nm.

Then, the biological liquid is applied on the shear-mode liquid-phase sensor to cause the molecules in the biological liquid to interact with the shear-mode liquid-phase sensor and to cause the specific molecules to bind with the probes on the groove structure. Because the different molecules in the biological liquid have different sizes, only the specific molecules can be trapped in the groove structure that fits the size of the specific molecule. Optionally, a washing process is performed to take off undesired molecules that do not bind to the probe in the groove structure after the specific molecules are trapped in the groove structure.

Figure 10A:
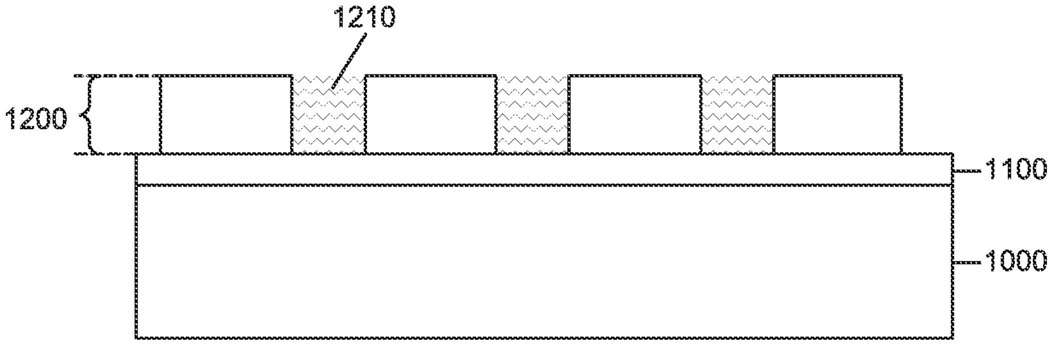
FIG. 10A is a schematic diagram showing the layer structure of the sensing area of the shear-mode liquid-phase sensor in the present invention without the specific molecules.
Figure 10B:
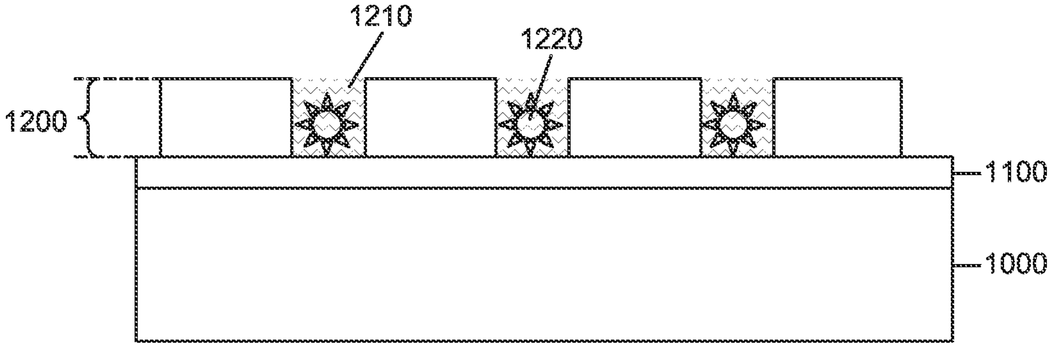
FIG. 10B is a schematic diagram showing the layer structure of the sensing area of the shear-mode liquid-phase sensor in the present invention with the specific molecules.

After the specific molecules are trapped in the groove structure, the amount of the specific molecules can be estimated by measuring characteristic change (e.g., phase change and amplitude change) of the shear-mode liquid-phase sensor. FIGS. 10A and 10B are schematic diagrams showing the layer structure of the sensing area of the shear-mode liquid-phase sensor in the present invention without and with the specific molecules, respectively. The sensing area in FIG. 10A or 10B includes a piezoelectric substrate 1000, a base layer 1100 and a bio-layer 1200. As shown in FIG. 10A, the bio-layer 1200 includes a groove structure 1210 and the liquid contained in the groove structure 1210 if the biological liquid without the specific molecules is applied on the sensing area. For clarity of presentation, the probes coated on the bottom surface of the groove structure 1210 are omitted in FIGS. 10A and 10B. As shown in FIG. 10B, the bio-layer 1200 includes a groove structure 1210 as well as the specific molecules 1220 and the liquid contained in the groove structure 1210 if the biological liquid with the specific molecules 1220 is applied on the sensing area. Because the average density of the bio-layer 1200 with the specific molecules 1220 in FIG. 10B is different from that without the specific molecules 1220 in FIG. 10A, the velocity and/or amplitude of the acoustic waves propagated on the sensing area in FIG. 10B is different from that in FIG. 10A. Accordingly, the amount of the specific molecules can be estimated by measuring the phase change and/or amplitude change between the shear-mode liquid-phase sensors in FIG. 10A and FIG. 10B.

In a further aspect, the present invention provides a method for estimating an amount of target molecules in a biological liquid by using the shear-mode liquid-phase sensor having the groove structure. This method can estimate the amount of the target molecules with a large size in the biological liquid by the shear-mode liquid-phase sensor.

Figure 11A:
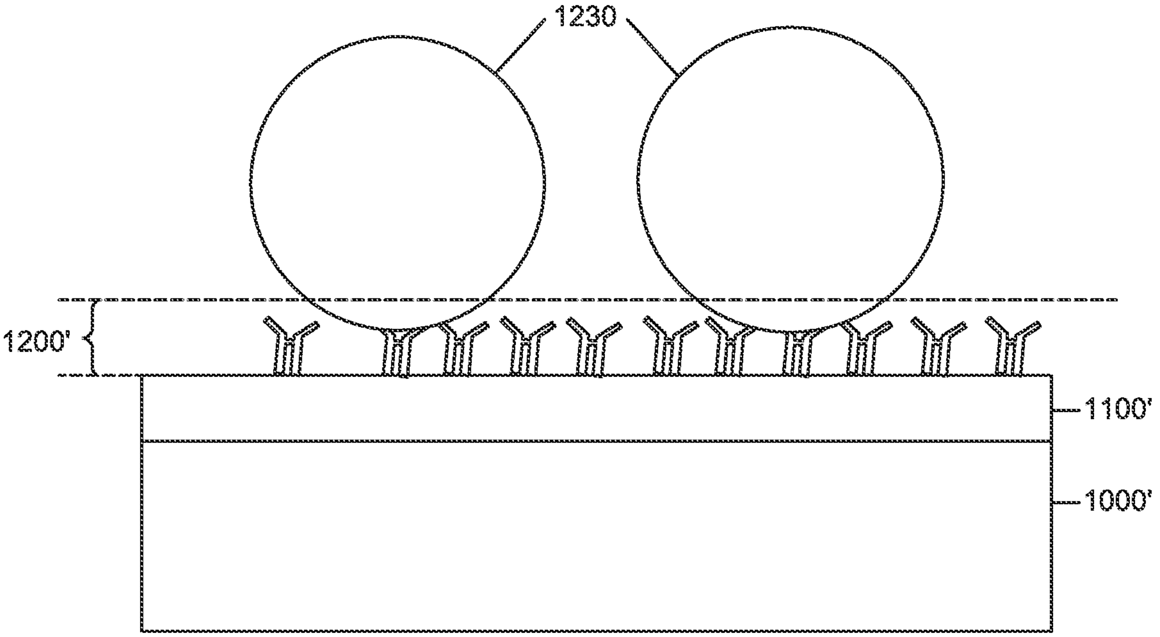
FIG. 11A is a schematic diagram showing the target molecules having a large size in the sensing area of the conventional shear-mode liquid-phase sensor.

Conventionally, it is difficult to estimate the amount of molecules with a large size (e.g., a pathogen such as virus) in the biological liquid by using the conventional shear-mode liquid-phase sensor in the art. FIG. 11A shows the target molecules 1230 with a large size in the sensing area of the conventional shear-mode liquid-phase sensor. The sensing area in FIG. 11A includes a piezoelectric substrate 1000', a base layer 1100' and a bio-layer 1200'. As shown in FIG. 11A, the size of the target molecules 1230 is too big to be contained in the bio-layer 1200', and thus the target molecules 1230 cannot move synchronously with the bio-layer 1200' when the acoustic waves propagate on the sensing area. Therefore, the amount of the target molecules 1230 cannot be estimated by measuring the characteristic change of the shear-mode liquid-phase sensor in the prior art.

To estimate the amount of the molecules with a large size in the biological liquid, the shear-mode liquid-phase sensor having the groove structure in the present invention is provided to trap the target molecules in the groove structure and enable the amount of the target molecules to be estimated. In order to capture the target molecules in the biological liquid, the probe binding to the target molecules is coated on the bottom surface of the groove structure. The groove structure has the width W and the depth D corresponding to the size of the target molecule. For example, the width W corresponds to 100% to 500% of the maximum length of each target molecule and the depth D corresponds to 50% to 500% of the maximum length of each target molecule. In one embodiment, the target molecule is a virus, and the width W preferably ranges from 100~5,000 nm and the depth D preferably ranges from 50~5,000 nm.

Then, the biological liquid is applied on the shear-mode liquid-phase sensor to cause the target molecules in the biological liquid to interact with the shear-mode liquid-phase sensor and to be trapped in the groove structure. Optionally, a washing process is performed to take off undesired molecules that do not bind to the probe in the groove structure after the target molecules are trapped in the groove structure. After the target molecules are trapped in the groove structure, the amount of the target molecules can be estimated by measuring characteristic change (e.g., phase change and amplitude change) of the shear-mode liquid-phase sensor.

Figure 11B:
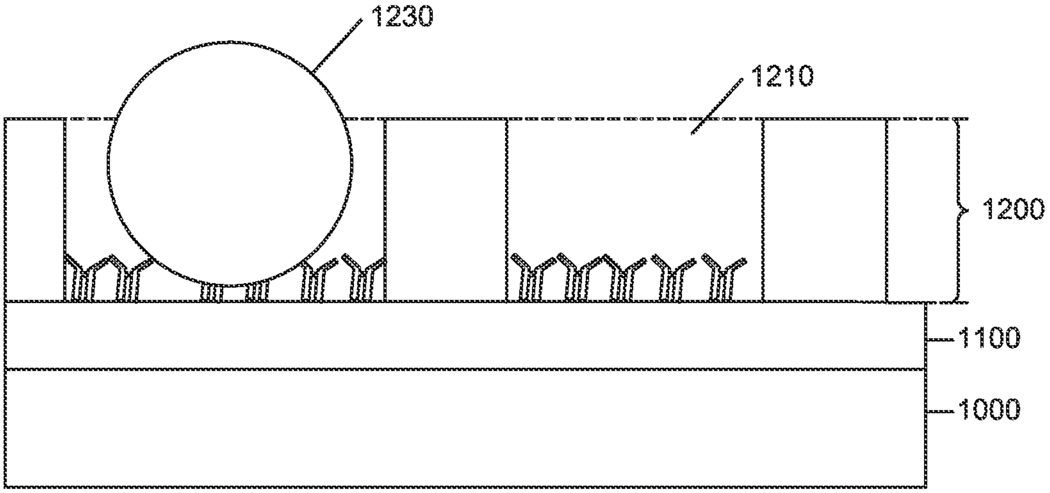
FIG. 11B is a schematic diagram showing the target molecules having a large size in the sensing area of the shear-mode liquid-phase sensor of the present invention.

FIG. 11B shows the target molecules 1230 with a large size in the sensing area of the shear-mode liquid-phase sensor of the present invention. The sensing area in FIG. 11B includes a piezoelectric substrate 1000, a base layer 1100 and a bio-layer 1200, and the bio-layer 1200 includes a groove structure 1210. When the biological liquid with the target molecules 1230 is applied on the sensing area, the target molecules 1230 trapped in the groove structure 1210 can move synchronously with the bio-layer 1200 when the acoustic waves propagate on the sensing area. In this case, the bio-layer 1200 can be considered as a part of the rigid structure with the groove structure 1210, and thus it is possible to estimate the amount of the specific molecules 1230 by measuring the characteristic change of the shear-mode liquid-phase sensor in the present invention.

By using the shear-mode liquid-phase sensor and the methods in the present invention, the analyses for the amount or presence of some particular molecules in a sample can be achieved accurately. In addition, the present invention provides a sensitive approach to analyze the target molecules in the biological sample by the shear-mode liquid-phase sensor.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A method using a shear-mode liquid-phase sensor having a groove structure in estimating an amount of specific molecules in a biological liquid, wherein the shear-mode liquid-phase sensor comprises a sensing area, over which a plurality of surface acoustic waves propagate, forming thereon the groove structure along a propagation direction of the plurality of surface acoustic waves, the groove structure has a bottom surface to be bound with the specific molecules, and the biological liquid includes a plurality of molecules having a common binding region, comprising:

providing the shear-mode liquid-phase sensor having the groove structure, wherein the groove structure has a width corresponding to 100% to 500% of a maximum length of each specific molecule and a depth corresponding to 50% to 500% of the maximum length of each specific molecule, and the groove structure is coated with a probe binding to the common binding region;

causing the plurality of molecules in the biological liquid to interact with the shear-mode liquid-phase sensor to trap the specific molecules in the groove structure; and estimating the amount of the specific molecules by measuring a characteristic change of the shear-mode liquid-phase sensor after the specific molecules are trapped in the groove structure.

2. The method as claimed in claim 1, wherein the common binding region is a common antigen or a binding site of an antibody, the width ranges from 10~200 nm, and the depth ranges from 5~500 nm.

3. The method as claimed in claim 1, wherein the characteristic change is a phase change and/or an amplitude change of the shear-mode liquid-phase sensor.

4. The method as claimed in claim 1, further comprising a step of:

performing a washing process to take off undesired molecules that do not bind to the probe in the groove structure after the specific molecules are trapped in the groove structure.

5. A method using a shear-mode liquid-phase sensor having a groove structure in estimating an amount of target molecules in a biological liquid, wherein the shear-mode liquid-phase sensor comprises a sensing area, over which a plurality of surface acoustic waves propagate, forming thereon the groove structure along a propagation direction of the plurality of surface acoustic waves, and the groove structure has a bottom surface to be bound with the target molecules, comprising:

providing the shear-mode liquid-phase sensor having the groove structure, wherein the groove structure has a width corresponding to 100% to 500% of a maximum length of the target molecule and a depth corresponding to 50% to 500% of the maximum length of the target molecule, and the groove structure is coated with a probe binding to the target molecule;

causing the target molecules in the biological liquid to interact with the shear-mode liquid-phase sensor and to be trapped in the groove structure; and estimating the amount of the target molecules by measuring a characteristic change of the shear-mode liquid-phase sensor after the target molecules are trapped in the groove structure.

6. The method as claimed in claim 5, wherein the characteristic change is a phase change and/or an amplitude change of the shear-mode liquid-phase sensor.

7. The method as claimed in claim 5, wherein the width ranges from 100~5,000 nm and the depth ranging from 50~5,000 nm.

8. The method as claimed in claim 5, further comprising a step of:

performing a washing process to take off undesired molecules that do not bind to the probe in the groove structure after the target molecules are trapped in the groove structure.

* * * * *